Nov. 12, 1957

F. C. WILLIAMS ET AL 2,813,255

ELECTRIC DELAY LINES

Filed March 8, 1954

INVENTORS
FREDERIC C. WILLIAMS, TOM KILBURN,
DAVID B.G. EDWARDS and GORDON E. THOMAS BY Stevens, Davis, Miller & Mosher
ATTORNEYS.

United States Patent Office 2,813,255
Patented Nov. 12, 1957

2,813,255

ELECTRIC DELAY LINES

Frederic Calland Williams, Romiley, and Tom Kilburn, Davyhulme, Manchester, England, and David Beverley George Edwards, Tonteg, near Pontypridd, and Gordon Eric Thomas, Port Talbot, Wales, assignors to National Research Development Corporation, London, England, a corporation of Great Britain Application March 8, 1954, Serial No. 414,814

Claims priority, application Great Britain March 18, 1953

14 Claims. (Cl. 333—31)

This invention relates to electromagnetic delay lines of the type frequently employed in connection with electric pulse signalling and, in particular, in connection with radar and electronic digital computing apparatus.

The increasing need for such electromagnetic delay lines whose delay time is of the order of 1 micro-second and which have a high constancy of delay time under varying conditions of operation, particularly of ambient temperature, has given rise to serious practical difficulties in their construction. Previously proposed forms of such electromagnetic delay lines have usually been of the so-called "distributed-capacitance" type in which the inductive element of the inductance-capacitance network is wound in close spaced relationship to a second conductor such as a slotted metal tube or an equivalent metal coating on the outer surface of an insulating rod or tube, such second conductor being then connected to form the common electrode of the capactive elements of the line network and having a direct capacitive effect with the various individual turns of the inductive element which turns themselves constitute the opposite electrodes of the various capacitive elements. Such a construction has been found to have a very poor temperature coefficient and its overall stability and in consequence its delay timing have been unreliable particularly for use in devices such as electronic digital computing machines where the use of a digit signalling speed of the order of 1 megacycle or more imposes a very stringent requirement regarding stability if faulty operation is not to occur due to cumulative errors introduced by a plurality of such delay devices operating in tandem.

In one form of construction which has been tried and found unsatisfactory a rod of suitable insulating material, e. g. of glass, ebonite or a plastic of the polythene type, has been covered with a silver coating layer appropriately scored to prevent eddy current loss and the inductive winding then laid upon the latter with, if necessary, the configuration of a modified form of the well known wave winding which provides for lateral displacement of the turns in order to reduce the capacitance between adjacent turns of the inductance while maintaining the required capacitance of the individual inductance turns to the common underlying electrode-forming layer. Investigation has suggested that the poor temperature coefficient is due to expansion of the rod and, with it, of the electrode layer. This expansion has apparently caused both compression of the dielectric between the common electrode and the surrounding inductive winding and the distortion of such surrounding winding itself thereby altering both the capacitance value and the inductance value with consequent serious disturbance of the overall time delay value of the device.

In accordance with the present invention an electromagnetic delay line comprises a suitable non-conductive core element, preferably of circular cross-section, along which is wound a first helix of insulated conductive wire followed by a second helix in the same rotary but in reversed longitudinal direction as the first helix to form the common capacitance electrode, the necessary inductive winding being then wound on top of the double helix with any desired winding pattern required to achieve the requisite inductance value with low inter-turn capacitance values.

With such a construction, by making the connection to the common capacitance electrode at the junction end of the first and second helical layers and by keeping the opposite ends of such helical layers open-circuited, it has been found that a greatly increased stability of delay characteristics can be provided.

In order that the invention may be better understood, one particular embodiment thereof and its method of manufacture will now be described with reference to the accompanying drawings in which Fig. 1 is a fragmentary cross-sectional view drawn to an enlarged scale, of a 1 microsecond delay line device suitable for use in an electronic digital computing machine.

Figure 1:
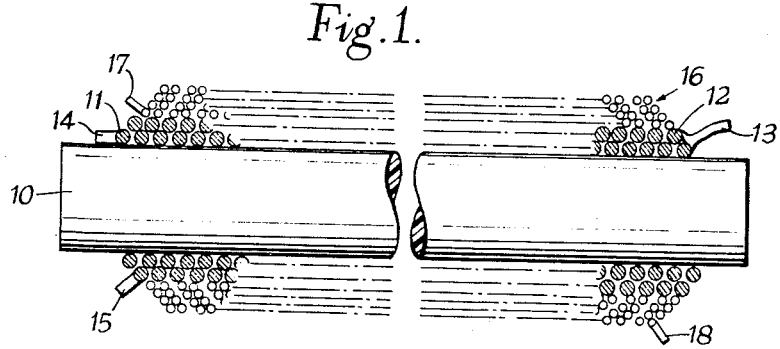

Referring first to Fig. 1 the core of the delay line device there shown comprises a rod 10 of insulating material. This rod may be of polythene or, more conveniently, of a heat resisting silicone-loaded ebonite such as that marketed under the trade name "Silvonite" by the Silvertown Rubber Company Limited of London, England. In the particular example being described and relating to a 1 microsecond delay line device, this rod is conveniently of approximately 0.125 inch (3.175 mm.) diameter and 8 inches (20.3 cm.) long. Its dimensional accuracy in diameter is ±0.002 inch (0.05 mm.).

Upon this rod 10 is wound a first helical layer 11 of No. 40 SWG (0.0048 inch–0.122 mm. diameter) insulated copper wire at a pitch of 36 turns per inch (14.2 turns per cm.) from a point near to one end of the rod 10 to a point near to the other end of such rod and upon this first helical layer is then wound a second and similar layer 12 as a continuation of the first in the same rotary direction but in the opposite longitudinal direction back to the starting point of the first layer. These two layers 11 and 12 are wound as tightly as possible and an electrical connection 13 is made thereto at the point where the two layers 11 and 12 are joined that is to say at the end of the rod 10 opposite to that at which the starting and finishing ends of the layers occur. The free ends 14 and 15 of the two layers are secured and are normally carefully insulated from each other so as to keep them open-circuit.

Upon the double helical layer thus provided and which forms the common capacitance electrode or earth screen of the delay line, is now wound the main inductive coil winding 16 which conveniently comprises about 4,700 turns of No. 46 SWG (0.0024 inch–0.061 mm. diameter) insulated wire. The turns of this inductive winding 16 are made under a tension of 1–2 ounces (30–60 grammes) and are distributed in a special manner which will be described later with reference to Fig. 2, whereby the total number of turns provides a form of open weave which is known in the radio and electronic art as "wave winding." In this kind of a winding each turn does not lie parallel to either its succeeding or preceding turn but is spaced from its succeeding and preceding turns and which has turns which also cross over turns other than the succeeding turn or the preceding turn at an angle. Accordingly, for the purpose of this specification and claims, a "wave wound group" in a winding shall be defined as a group of successive turns of a winding which corresponds to the above definition of a wave winding. The inductive winding 16 is about 4 layers deep and extending progressively from a point near to one end of the rod 10 to a point near to the opposite end of such rod, the commencing and terminating ends 17 and 18 of the winding 16 being at opposite ends of the rod 10.

Figure 2:
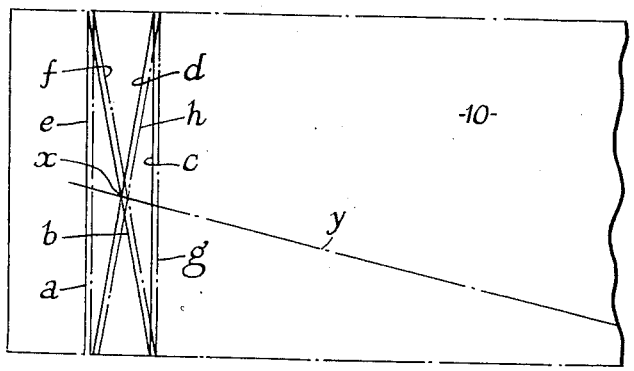
Fig. 2 is a development view, also much enlarged, showing the manner of positioning the various successive turns of the inductive winding.
Figure 3:
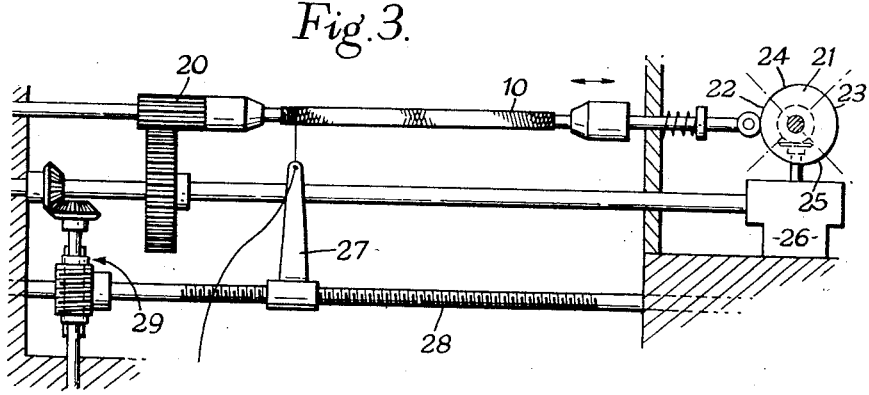
Fig. 3 is a diagrammatic view illustrating the general form of machine used for winding the inductive winding of the delay line device.

The preferred method of winding the inductive winding 16 will now be described more particularly with reference to Fig. 2. The method of winding is as shown by making a first turn *a* as a plain circumferential turn, i. e. without any displacement longitudinally of the rod 10 and then making the second turn *b* as one which consists of one convolution of an opened helix finishing such single convolution at a point about 0.125 inch (3.175 mm.) displaced along the length of the rod 10 towards the opposite end of the latter. The third turn *c* is made as another plain circumferential turn like turn *a* while the fourth turn *d* is made as a second single convolution of an opened-out helix like turn *b* but displaced in the opposite direction along the rod, i. e. back towards the starting turn *a*. This form of winding is then continued whilst a very slow longitudinal traverse is superimposed thereon whereby the fifth turn *e*, resembling the turn *a*, is applied over and slightly displaced from the latter followed by a sixth turn *f* similarly resembling and slightly displaced from turn *b*, a seventh turn *g* similarly resembling and slightly displaced from turn *c* and an eighth turn *h* similarly resembling and displaced from turn *d*. As a result of this superimposed longitudinal traverse successive similar turns such as the fifth, ninth, thirteenth, seventeenth . . . turns do not lie directly superimposed upon their equivalent predecessors but lie very slightly displaced towards the opposite end of the rod. In addition a slight circumferential creep or progression is imparted to the various cross-over points such as is indicated at *x* in Fig. 2 whereby these do not lie upon straight lines parallel with the axis of the core rod 10 but lie, instead, upon helical lines as indicated at *y*. In this way, with the number of turns and wire size quoted above, the requisite winding can be accommodated within a length of the rod 10 of between 6 and 7 inches (15.2–17.8 cms.) and it is found that the total radial depth of the winding 16 does not at any place exceed about 4 layers.

Such a delay line construction has been found to have a temperature coefficient of less than 0.02% per degree centigrade of temperature change compared with values ranging from a best figure of 0.04% per degree centigrade to 0.5% or even worse obtained with the more conventional constructions previously described. The wire used for both windings is preferably of the usual high conductivity copper type which is insulated with a vinyl acetal synthetic plastic coating as distinguished from the more usual enamel coating. Such wire is conveniently that marketed under the trade name "Lewmex," Grade M by the London Electric Company and Smiths Limited of London, England. It has been found that the ordinary enamel coated wire is unsatisfactory at the small winding diameter employed.

A completed delay line constructed as described above and having a delay time of 1 microsecond has been found to have a mean surge impedance of 1500 ohms. The band width for 3 db voltage attenuation is 3 megacycles. The characteristics of the line can be altered by adjusting the form of the common capacitance electrode winding 11, 12, e. g. by altering the number of turns thereof and their inter-turn spacing distance. Further modification is obtainable by electrically interconnecting the two free ends 14, 15 of this double helix electrode winding instead of leaving them open-circuit. Such interconnection has been found to alter the surge impedance of the line at one end relative to the other, the respective values in the particular example described in detail above being about 1200 ohms and 1700 ohms. This variable surge impedance characteristic may be of value in certain circumstances for providing a voltage gain.

The form of machine used for forming the inductive winding of such a line is illustrated in Fig. 4 where the core rod 10, forming the mandrel and already having the double helix common capacitance electrode winding thereon, is mounted in suitable rotating means 20 which can, when required, also be made to oscillate axially during winding by means of a two-step disc cam 21 having two diametrically opposed surface portions 22, 23 each of 90° arc and each having a constant radius which is different from that of the other by 0.125 inch (3.17 mm.), such portions 22, 23, being interconnected by intermediate portions 24, 25 which are each also of 90° arc but of such sloping contour as to impart a linear change from the radius dimension of one portion 22, 23, to the other. The cam 21 is arranged to be driven through a gear-box 26 having a reduction ratio of 4:1 times 28:24 from the mandrel rotating means 20. The 4:1 ratio factor produces the necessary 4 turn cycle of winding described above whereas the 28:24 ratio factor provides for the aforesaid creep or progression of the winding cross-over points along the helical path *y* of Fig. 2. The wire guide 27 is moved by connection to a lead screw 28 having a pitch of 20 turns per inch and this lead screw is driven from the mandrel rotating means through gearing 29 which provides a ratio of 36:1 between the mandrel rotating means 20 and the lead screw 28.

We claim:

1. An electromagnetic delay line comprising a non-conductive core element, a capacitance electrode wound on said core element and comprising a first single layer helix of insulated conductive wire extending from a first end point to a second end point and a second single layer helix overlying said first helix and extending around said core with the same rotary sense as said first layer helix but in the reverse longitudinal direction from said second end point to said first end point, a continuous inductive winding of insulated wire wound directly on top of said second helix of said capacitance electrode, said inductive winding comprising a repeated series of multi-turn groups each group comprising at least one helical turn having a pitch dimension greater than the insulated wire diameter extending from a first axial position to a displaced second axial position and then at least one further helical turn also having a pitch dimension greater than the insulated wire diameter extending back to a third axial position which is closely adjacent to said first axial position but slightly displaced towards said second axial position and each of said groups partially overlying at least one of the immediately preceding groups, an input terminal connected to one end of said inductive winding, an output terminal connected to the opposite end of said inductive winding and a common capacitance electrode terminal connected to said capacitance electrode.

2. An electromagnetic delay line comprising a non-conductive core element, a capacitance electrode wound on said core element and comprising a first single layer helix of insulated conductive wire extending from a first end point to a second end point, a continuous second single layer helix overlying said first helix and extending around said core with the same rotary sense as said first layer helix but in the reverse longitudinal direction from said second end point towards said first end point and a continuous inductive winding wound on top of said capacitance electrode, said inductive winding comprising a repeated series of multi-turn wave wound groups each group subsequent to the first being slightly displaced axially so as to overlie a major part of the preceding group, an input terminal connected to one end of said inductive winding, an output terminal connected to the opposite end of said inductive winding and a common capacitance electrode terminal connected to said capacitance electrode.

3. An electromagnetic delay line comprising a non-conductive core element, a capacitance electrode on the outer surface of said core element, a continuous inductive winding on said capacitance electrode in close capacitive relationship thereto, said inductive winding comprising a repeated series of multi-turn groups each group comprising at least one helical turn having a pitch dimension greater than the insulated wire diameter extending from a first axial position to a displaced second axial position and at least one further helical turn also having a pitch diameter greater than the insulated wire diameter extending back to a third axial position closely adjacent to said first axial position but slightly displaced towards said second axial position and each group subsequent to the first being displaced slightly in an axial direction so as to overlie a major part of the immediately preceding group, an input terminal connected to one end of said inductive winding, an output terminal connected to the opposite end of said inductive winding and a common capacitance electrode terminal connected to said capacitance electrode.

4. An electromagnetic delay line comprising a core rod of insulating material, a capacitance electrode on the outer surface of said core rod and comprising a helical winding of insulated conductive wire, a continuous inductive winding wound directly on top of said capacitance electrode, said inductive winding comprising a repeated series of multi-turn groups each group comprising at least one helical turn having a pitch dimension greater than the insulated wire diameter extending from a first axial position to a displaced second axial position and at least one further helical turn also having a pitch diameter greater than the insulated wire diameter extending back to a third axial position closely adjacent to said first axial position but slightly displaced towards said second axial position and each group subsequent to the first being slightly displaced in both the axial direction and in the circumferential direction so as to overlie a major part of the immediately preceding group, an input terminal connected to one end of said inductive winding, an output terminal connected to the opposite end of said inductive winding and a common capacitance electrode terminal connected to said capacitance electrode.

5. An electromagnetic delay line which comprises a non-conductive rigid core element, a capacitance electrode on said core element, said capacitance electrode comprising a first helix of insulated conductive wire extending from a first end point to a second end point and a second helix of conductive wire electrically continuous with said first helix and extending in overlying relationship to said first helix from said second end point back towards said first end point, an inductive winding on top of said capacitance electrode and in close spaced high capacitance relationship thereto, said inductive winding comprising a repeated series of four turn winding groups each group comprising a first purely circumferential turn followed by a second helical turn having a pitch dimension greater than the insulated wire diameter followed by a third purely circumferential turn axially spaced by the pitch of said second helical turn from said first circumferential turn and a fourth helical turn of a pitch slightly less than said second helical turn wound back towards said first circumferential turn, the successive similar turns on each of the groups being slightly displaced axially in the direction of displacement of the first helical turn, an input terminal connected to one end of said inductive winding, an output terminal connected to the opposite end of said inductive winding and a common capacitance electrode terminal connected to said capacitance electrode terminal connected to said capacitance electrode.

6. An electromagnetic delay line which comprises a non-conductive rigid core element, a capacitance electrode on the outer surface of said core element, said capacitance electrode comprising a helical winding of insulated conductive wire, an inductive winding directly on top of said capacitance electrode in close spaced high capacitance relationship thereto, said inductive winding comprising a repeated series of four turn winding groups each group comprising a first purely circumferential turn followed by a second helical turn having a pitch dimension greater than the insulated wire diameter followed by a third purely circumferential turn axially spaced by the pitch of said second helical turn from said first circumfeerntial turn and a fourth helical turn of a pitch slightly less than said second helical turn wound back towards said first circumferential turn, the successive similar turns on each of the groups being slightly displaced axially in the direction of displacement of the first helical turn, an input terminal connected to one end of said inductive winding, an output terminal connected to the opposite end of said inductive winding and a common capacitance electrode terminal connected to said capacitance electrode.

7. An electromagnetic delay line which comprises a rigid core rod of insulating material, a capacitance electrode on the outer surface of said core rod, an inductive winding directly on said capacitance electrode in close spaced high capacitance relationship thereto, said inductive winding comprising a repeated series of four turn winding groups each group comprising a first purely circumferential turn followed by a second helical turn having a pitch dimension greater than the insulated wire diameter followed by a third purely circumferential turn axially spaced by the pitch of said second helical turn from said first circumferential turn and a fourth helical turn of a pitch slightly less than said second helical turn wound back towards said first circumferential turn, the successive similar turns on each of the groups being slightly displaced both in a circumferential direction and in the axial direction of displacement of the first helical turn, an input terminal connected to one end of said inductive winding, an output terminal connected to the opposite end of said inductive winding and a common capacitance electrode terminal connected to said capacitance electrode.

8. An electromagnetic delay line which comprises a rigid core rod of insulating material, a capacitance electrode on the outer surface of said core rod, said capacitance electrode comprising a first single layer helix of insulated conductive wire extending from a first end point to a second end point and a second single layer helix of conductive wire electrically continuous with said first helix and extending in direct overlying relationship to said first helix from said second end point back towards said first end point, an inductive winding disposed directly on top of said second helix of said capacitance electrode and in close spaced high capacitance relationship thereto, said inductive winding comprising a continuous winding of insulated conductive wire arranged as a repeated series of four turn groups each group comprising a first purely circumferential turn followed by a second helical turn having a pitch dimension greater than the insulated wire diameter followed by a third purely circumferential turn axially spaced by the pitch of said second helical turn from said first circumferential turn and a fourth helical turn of a pitch slightly less than said second helical turn wound back towards said first circumferential turn, the successive similar turns on each of the groups being slightly displaced both in a circumferential direction and in the axial direction of displacement of the first helical turn, an input terminal connected to one end of said inductive winding, an output terminal connected to the opposite end of said inductive winding and a common capacitance electrode terminal connected to said capacitance electrode.

9. An electromagnetic delay line according to claim 2 in which said capacitance electrode terminal is connected to the junction point between said first and second helical layers.

10. An electromagnetic delay line according to claim 9 in which the end of said first helix at said first end point and the end of said second helix also adjacent said first end point are electrically insulated from one another.

11. An electromagnetic delay line according to claim 2 wherein the end of said first helix at said first end point is electrically interconnected with the end of said second helix also adjacent said first end point.

12. An electromagnetic delay line according to claim 2 wherein the end of said first helix at said first end point is electrically interconnected with the end of said second helix also adjacent said first end point and in which said capacitance electrode terminal is connected to the junction point between said first and second helical layers at said second end point.

13. An electromagnetic delay line according to claim 2 in which said non-conductive core element is of polythene.

14. An electromagnetic delay line according to claim 2 in which said capacitance electrode and said inductive winding are each formed of conductive wire having an insulating coating of plastic material.

References Cited in the file of this patent

UNITED STATES PATENTS

| | | |
|---|---|---|
| 2,387,783 | Tawney | Oct. 30, 1945 |
| 2,452,572 | Jago | Nov. 2, 1948 |
| 2,467,184 | Blewett | Apr. 12, 1949 |
| 2,520,991 | Yolles | Sept. 5, 1950 |

FOREIGN PATENTS

| | | |
|---|---|---|
| 606,551 | Great Britain | Aug. 16, 1948 |